(12) United States Patent
Ikeuchi et al.

(10) Patent No.: US 9,075,728 B2
(45) Date of Patent: Jul. 7, 2015

(54) DISK ARRAY DEVICE AND METHOD FOR CONTROLLING DISK ARRAY DEVICE

(75) Inventors: Kazuhiko Ikeuchi, Kawasaki (JP);
Hidejirou Daikokuya, Kawasaki (JP);
Chikashi Maeda, Kawasaki (JP);
Norihide Kubota, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 517 days.

(21) Appl. No.: 13/091,924

(22) Filed: Apr. 21, 2011

(65) Prior Publication Data
US 2011/0289273 A1  Nov. 24, 2011

(30) Foreign Application Priority Data

May 21, 2010  (JP) ................................. 2010-117527

(51) Int. Cl.
| G06F 12/16 | (2006.01) |
| G06F 12/08 | (2006.01) |
| G06F 3/06 | (2006.01) |
| G06F 11/20 | (2006.01) |

(52) U.S. Cl.
CPC .......... *G06F 12/0868* (2013.01); *G06F 3/0613* (2013.01); *G06F 3/0632* (2013.01); *G06F 3/0635* (2013.01); *G06F 3/0685* (2013.01); *G06F 3/0689* (2013.01); *G06F 11/201* (2013.01); *G06F 2212/261* (2013.01)

(58) Field of Classification Search
CPC .............. G06F 3/0689; G06F 11/2094; G06F 11/1076; G06F 11/2082
USPC .......................................................... 711/114
See application file for complete search history.

(56) References Cited

U.S. PATENT DOCUMENTS

| 5,754,756 | A | * | 5/1998 | Watanabe et al. ............ 714/6.21 |
| 5,845,319 | A | * | 12/1998 | Yorimitsu ...................... 711/114 |
| 7,047,278 | B2 | | 5/2006 | Miyazawa et al. |
| 7,237,021 | B2 | | 6/2007 | Penny et al. |
| 7,774,640 | B2 | | 8/2010 | Tanabe et al. |
| 8,086,773 | B2 | | 12/2011 | Nkajima |
| 2004/0107300 | A1 | * | 6/2004 | Padmanabhan et al. .......... 710/1 |
| 2005/0015566 | A1 | * | 1/2005 | Zohar et al. .................... 711/203 |
| 2005/0097132 | A1 | * | 5/2005 | Cochran et al. ............ 707/104.1 |
| 2006/0143379 | A1 | * | 6/2006 | Khan et al. .................... 711/114 |

(Continued)

FOREIGN PATENT DOCUMENTS

| JP | 4-170624 A | 6/1992 |
| JP | 2002-288105 A | 10/2002 |
| JP | 2006-524864 A | 11/2006 |

(Continued)

OTHER PUBLICATIONS

Japanese Office Action mailed Jan. 7, 2014 for corresponding Japanese Application No. 2010-117527, with Partial English-language Translation.

*Primary Examiner* — Aimee Li
*Assistant Examiner* — Trang Ta
(74) *Attorney, Agent, or Firm* — Fujitsu Patent Center

(57) ABSTRACT

A disk array device includes, a cache memory, a plurality of types of disk drives of which data transfer capacity are different, redundant transmission paths that are data transfer paths between the cache memory and the disk drives, and a controller to divide the disk drives into two groups based on the data transfer capacity and allocate each of the two groups to each of the redundant transmission paths when the disk drives have three types.

1 Claim, 12 Drawing Sheets

(56) References Cited

U.S. PATENT DOCUMENTS

2008/0244139 A1* 10/2008 Nakajima .................. 710/300
2008/0263394 A1* 10/2008 Tanabe et al. .................. 714/8

FOREIGN PATENT DOCUMENTS

| JP | 2008-250631 A | 10/2008 |
| JP | 2008-269142 A | 11/2008 |

* cited by examiner

FIG. 2A

| | DISK A GROUP | DISK B GROUP | DISK C GROUP | DISK D GROUP |
|---|---|---|---|---|
| MAXIMUM DATA TRANSFER CAPACITY | 40KB | 80KB | 100KB | 120KB |
| NUMBER OF DISK DRIVES COUPLED TO PATH #1 | 20 | 40 | 20 | 40 |
| NUMBER OF DISK DRIVES COUPLED TO PATH #2 | 20 | 20 | 20 | 60 |

FIG. 2B

| | DISK A GROUP | DISK B GROUP | DISK C GROUP | DISK D GROUP |
|---|---|---|---|---|
| DISK DRIVES COUPLED TO PATH #1 | PORT a | PORT a | PORT b | PORT b |
| DISK DRIVES COUPLED TO PATH #1 | PORT a | PORT a | PORT a | PORT b |

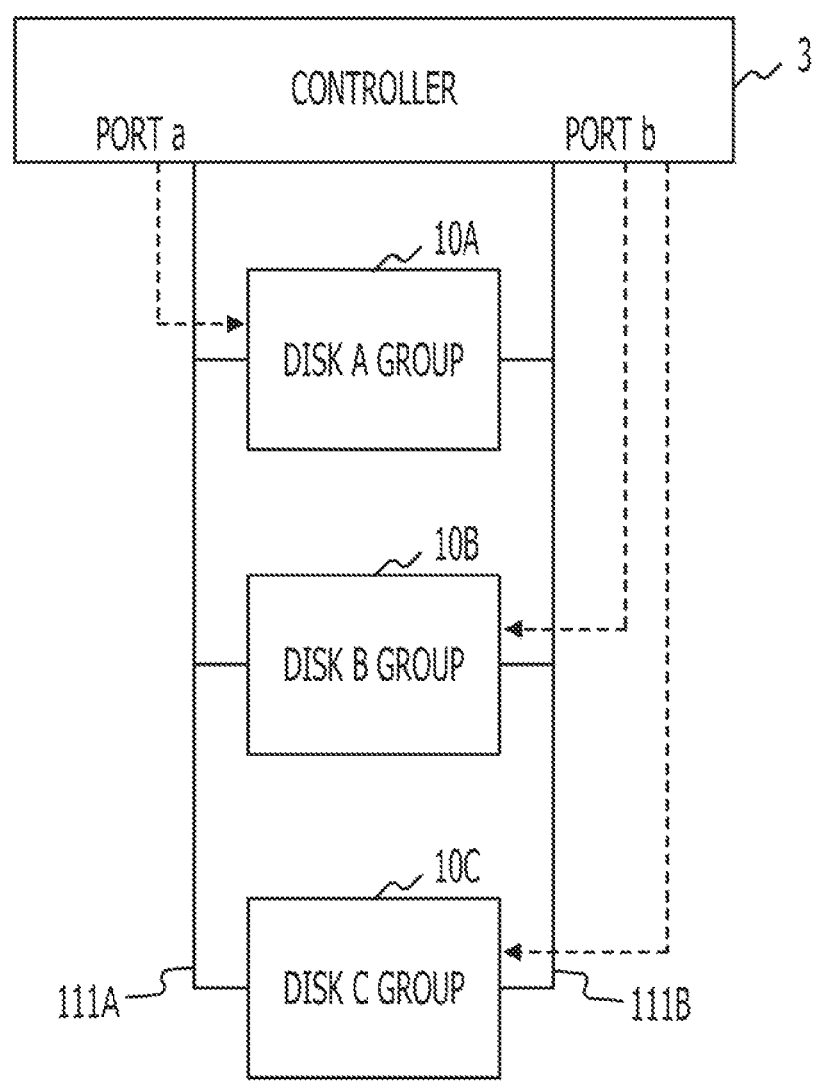

FIG. 9A

| COMMAND | COMMAND TYPE | SOURCE ADDRESS OF DATA TRANSFER | DESTINATION ADDRESS OF DATA TRANSFER | I/O TRANSFER LENGTH | .... |

FIG. 9B

MAXIMUM DATA TRANSFER LENGTH
10A : 40KB
10B : 80KB
10C : 100KB

PORT a : 0~40KB
PORT b : 40~100KB

FIG. 9C

I/O TRANSFER LENGTH
10A : 30KB
10B : 60KB
10C : 20KB

PORT a : 0~40KB
PORT b : 40~100KB

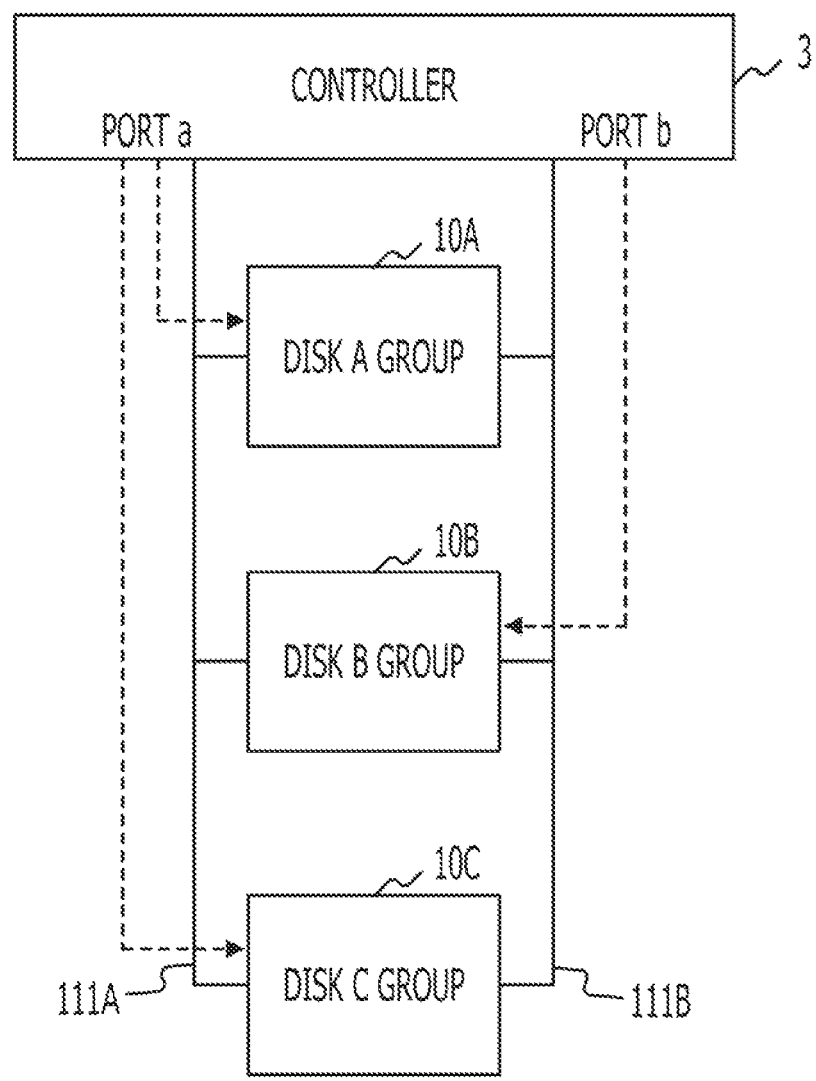

DISK ARRAY DEVICE AND METHOD FOR CONTROLLING DISK ARRAY DEVICE

CROSS-REFERENCE TO RELATED APPLICATIONS

This application is based upon and claims the benefit of priority of the prior Japanese Patent Application No. 2010-117527, filed on May 21, 2010, the entire contents of which are incorporated herein by reference.

FIELD

Embodiments discussed herein relate to a disk array device and a method for controlling the disk array device.

BACKGROUND

In a disk array device, multiple disk drives are coupled to a single control module, thereby causing undesirable data transfer in transmission paths coupling the multiple disk drives to the control module.

In data transmission and reception of a storage area network system, a certain data transfer amount between a user server and each magnetic disk drive through an I/F port is specified. For example, a certain storage area network system has been proposed that obtains a data transfer amount between a user server and each of the magnetic disk drives, monitors the data transfer amount, compares the obtained data transfer amount with a specified data transfer amount of the user server, selects an I/F port based on the comparison result, and gives the corresponding server instructions to be coupled to the I/F port.

In addition, each disk array device including two or more types of disk drives is associated with a set of management rules. In the disk array devices, it has been proposed that management rules may include, for example, rules for identifying a dedicated disk array device, setting the dedicated disk array device, transmitting disk protocol messages to the dedicated disk array device, processing the disk protocol messages received in the dedicated disk array device, and processing an error condition and an exception condition.

In a disk array system, when multiple disk drives having different data transfer capacities are coupled to an identical transmission path, it is probable that imbalance in a data transfer amount with respect to each of the disk drives is caused.

SUMMARY

According to an aspect of the embodiment, a disk array device includes, a cache memory, a plurality of types of disk drives of which data transfer capacity are different, redundant transmission paths that are data transfer paths between the cache memory and the disk drives, and a controller to divide the disk drives into two groups based on the data transfer capacity and allocate each of the two groups to each of the redundant transmission paths when the disk drives have three types.

Advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2A illustrates an example of a disk group management table;

FIG. 2B illustrates an example of a transmission path management table;

FIG. 8 illustrates another example of the disk allocation processing;

FIG. 9A illustrates an example of I/O processing request commands;

FIG. 9B illustrates values of maximum data transfer lengths;

FIG. 9C illustrates values of I/O transfer lengths;

FIG. 10 illustrates another example of the disk allocation processing;

DESCRIPTION OF THE EMBODIMENTS

In a disk array system, when multiple disk drives are coupled to an identical transmission path, data transfer with respect to each of the disk drives is constrained based on data transfer capacity of the transmission path.

Figure 12A:
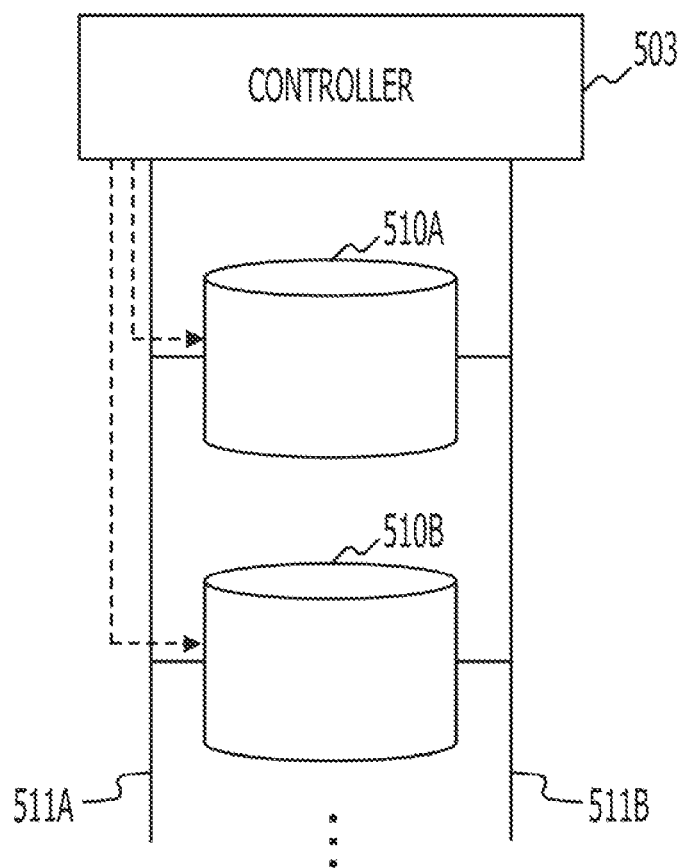
FIGS. 12A and 12B illustrate data transfer in the disk array device.

For example, as illustrated in FIG. 12A, in a disk array device, disk drives 510A and 510B are coupled to a controller 503 through identical transmission paths 511A and 511B. The transmission paths from the controller 503 to the disk drives 510A and 510B may be redundant transmission paths. Each of the disk drives 510A and 510B are coupled to the identical redundant transmission paths 511A and 511B.

Figure 12B:
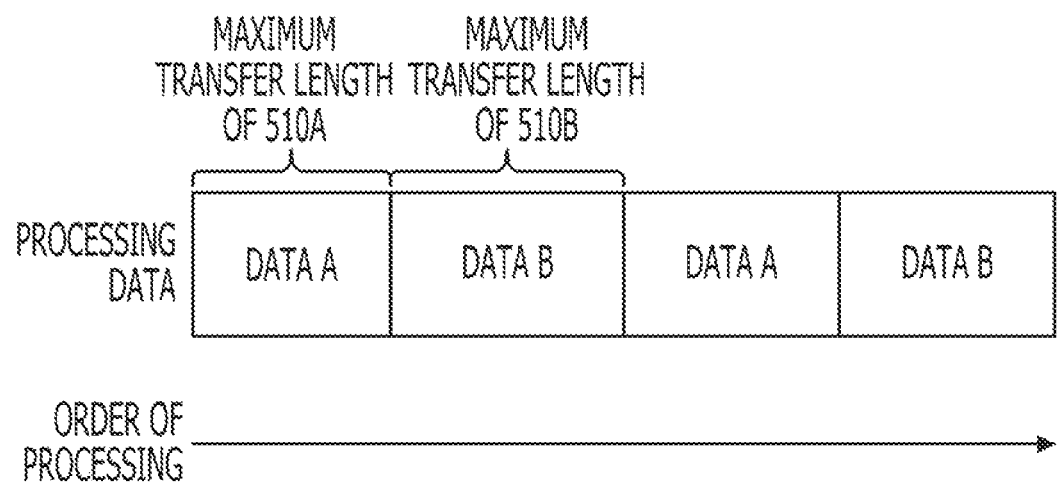

The data transfer capacity of the disk drive 510A is different from the data transfer capacity of the disk drive 510B. For example, as illustrated in FIG. 12B, the data transfer capacity of the disk drive 510A is smaller than the data transfer capacity of the disk drive 510B. For example, "data transfer capacity" may be a maximum size of data to be transferred by a disk drive in a single data transfer operation, that is, a maximum transfer length.

In FIG. 12A, when X or more disk drives, where X indicates a certain number, are coupled to the transmission paths 511A and 511B, data transfer capacity of a transmission path, which is a path where data is transferred may be a bottleneck of performance of the disk array device. As described above, in such state where data transfer capacity of a transmission path is a bottleneck of performance, when read processing is performed, an I/O request is in a data transfer-waiting state in the disk drive 510A or 510B, and when write processing is performed, an I/O request is in a data transfer-waiting state in the controller 503. After the processing of the I/O request currently being executed is completed, a new I/O request is performed.

Thus, when data transfer capacity of a transmission path is a bottleneck of performance, data transfer capacity is difference between the disk drive 510A and the disk drive 510B, thereby causing imbalance in a data transfer amount.

For example, as illustrated in FIG. 12B, the disk drives 510A and 510B may perform data transfer by turns or for the same number of times. In addition, when the disk drives 510A and 510B may transfer maximum transfer length data in a single data transfer operation, the disk drive 510B may transfer more data than the disk drive 510A because the data transfer capacity of the disk drive 510B is larger than the data transfer capacity of the disk drive 510A as illustrated in FIG. 12B.

In the processing of data transfer, a disk array device according to an embodiment may reduce the imbalance when different types of disk drives are coupled to an identical transmission path.

Figure 1:
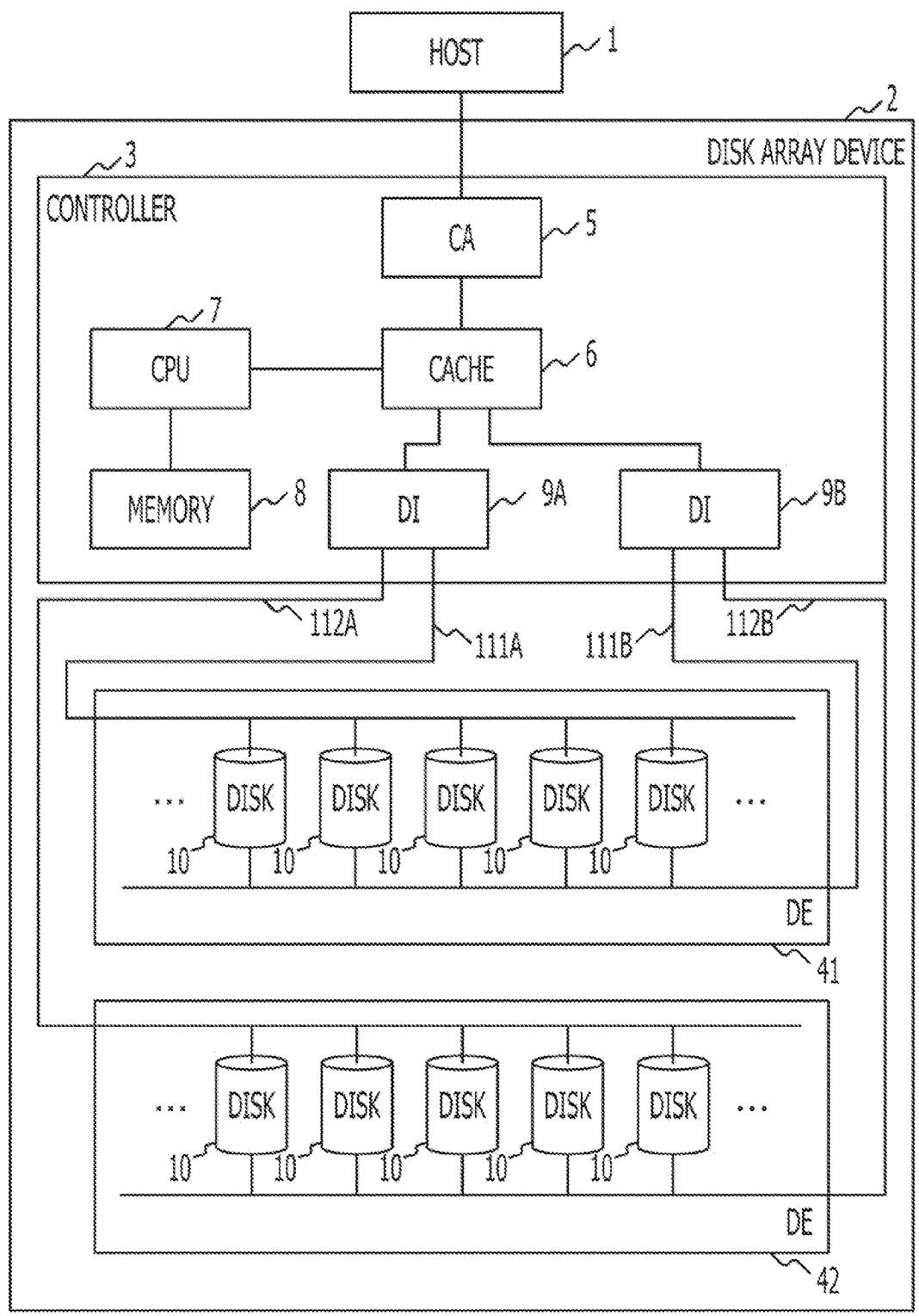
FIG. 1 illustrates configuration of a disk array device.

FIG. 1 illustrates configuration of the disk array device.

A disk array device 2 is coupled to a host computer 1. The disk array device 2 includes a controller 3 and two or more device enclosures (DE) 41 and 42. The controller 3 includes a Channel Adapter (CA) 5, a cache 6, a Central Processing Unit (CPU) 7, a memory 8, and two device interfaces (DI) 9A and 9B. Each of the DE 41 and 42 includes multiple disk drives 10. The disk drive 10 is a unit storage device. The number of DE may not be limited to two DE such as DE 41 and 42. The number of the disk drives 10 may not be limited to five disk drives as illustrated in FIG. 1. For example, the disk array device 2 may be a Redundant Arrays of Inexpensive Disks (RAID) device.

As illustrated in FIG. 1, the controller 3 is coupled to the DE 41 and 42 through redundant transmission paths 111A and 111B, and redundant transmission paths 112A and 112B, respectively. For example, the transmission paths 111A, 111B, 112A, and 112B may be a Fibre Channel (FC), a Serial Attached SCSI (SAS), or the like. The transmission paths 111A and 111B, and the transmission paths 112A and 112B may be redundant transmission paths, respectively, between the controller 3 and the disk drives 10. As a result, for example, even when failures occur in the transmission path 111A or 112A, data transfer may be performed through the transmission path 111B or 112B instead.

For example, the transmission paths 111A and 111B are redundant transmission paths with respect to the multiple disk drives 10 included in the DE 41, and the transmission paths 112A and 112B are redundant transmission paths with respect to the multiple disk drives 10 included in DE 42. The redundant transmission paths 111A and 111B, and the redundant transmission paths 112A and 112B are paths for data transfer between the cache 6 and the disk drives 10.

The DI 9A and 9B, that is, communication ports of the controller 3 may be redundant ports corresponding to the redundant transmission paths 111A and 111B, and the redundant transmission paths 112A and 112B. The DI 9A may be couple to the transmission paths 111A and 112A. The DI 9B may be couple to the transmission paths 111B and 112B.

In the DE 41, one of the redundant transmission paths 111A and 111B is allocated to each of the multiple disk drives 10 included in the DE 41 when allocation processing (described later) is performed. For example, when the transmission path 111A is allocated to a certain disk drive 10, access to the certain disk device 10 is performed through the allocated transmission path 111A.

In addition, as a result of the allocation of the transmission path 111A to the certain disk drive 10, the DI 9A coupled to the transmission path 111A is allocated with respect to the certain disk drive 10. Thus, access to the certain disk drive 10 is performed through the allocated DI 9A.

In the disk array device 2 of FIG. 1, the disk drives 10 have three or more types of data transfer capacity. As described above, data transfer paths between the cache 6 and the three or more types of disk drives 10 may be redundant paths. Thus, the number of types "3" in the disk drives 10 included in the DE 41 is lager than the degree of multiplexing "2" in the transmission paths 111A and 111B, and larger than the degree of multiplexing "2" in the DI 9A and 9B.

In addition, for example, one of the redundant transmission paths 112A and 112B is allocated to each of the disk drives 10 included in the DE 42. That is, for example, when the transmission path 112B and the DI 9B are allocated to a certain disk drive 10, access to the certain disk device 10 is performed through the allocated transmission path 112B and the DI 9B. The number of types "3" in the disk drives 10 included in the DE 42 is lager than the degree of multiplexing "2" in the transmission paths 112A and 112B, and larger than the degree of multiplexing "2" in the DI 9A and 9B.

The number of the disk array device 2 coupled to the host computer 1 is not limited to single, and the number of the disk array device 2 coupled to the host computer 1 may be two or more. In addition, the disk drive 10 may employ various storage devices such as a hard disk device, for example, a Hard Disk Drive (HDD), and a semiconductor disk device, for example, a Solid State Drive (SSD).

The disk array device 2 writes data received from the host computer 1 into the disk drive 10 in response to a write request from the host computer 1. In addition, the disk array device 2 reads data from the disk drive 10 and transfers the data to the host computer 1 in response to a read request from the host computer 1.

In the disk array device 2, the CA 5 is coupled between the host computer 1 and the cache 6 and controls data transfer between the host computer 1 and the disk array device 2. For example, the CA 5 receives a write request and data from the host computer 1 and transfers the write request and the data to the cache 6. In addition, the CA 5 receives a read request from the host computer 1 and transfers the read request to the cache 6. After that, the CA 5 receives data from the cache 6 and transfers the data to the host computer 1 in response to the read request.

Generally, the cache 6 may include a cache memory to store data and a cache controller to control the cache memory. In the cache memory, data transferred from the host computer 1 or data read out from the disk drive 10 is temporarily stored. The cache memory may be a memory that transfers data desirably faster than the disk drive 10, for example, a semiconductor memory such as a Dynamic Random Access Memory (DRAM).

When the cache 6 receives a write request and data, the data is written into the cache memory. After that, the cache 6 writes the data stored in the cache memory into a disk drive 10 through the DI 9A or 9B.

For example, in data-write processing, when a certain disk drive 10 into which data is written is included in the DE 41 and the transmission path 111A is allocated to the certain disk drive 10, the data is transferred from the cache 6 to the certain disk drive 10 through the DI 9A and the transmission path 111A.

In the reception of a read request in the cache 6, when requested data exists in the cache memory, the cache 6 reads the requested data from the cache memory and transmits the requested data to the CA 5. When requested data does not exist in the cache memory, the cache 6 reads the requested data from a certain disk drive 10 through the DI 9A or 9B and transmits the requested data to the CA 5. The CA 5 transmits the received data to the host computer 1.

For example, in data-read processing, when a certain disk drive 10 from which data is read is included in the DE 41 and the transmission path 111A is allocated to the certain disk drive 10, the data is transferred from the certain disk drive 10 to the cache 6 through the DI 9A and transmission path 111A.

The CPU 7 collects disk information by communicating with each of the multiple disk drives 10 included in the disk array device 2 and creates a disk group management table 81 based on the collected disk information. Thus, the CPU 7 may be a disk group management table creation unit. The communication between the CPU 7 and each of the disk drives 10 is performed, for example, when the power is applied to the disk array device 2 or when a new disk drive 10 is coupled to the disk array device 2. In addition, for example, the communication is periodically performed when the disk array device 2 is in operation. When disk information of a certain disk drive 10 deleted (removed) from the disk array device 2 is not obtained, the CPU 7 may be notified of the deletion of the certain disk drive 10 from the disk array device 2. Thus, when the power is applied to the disk array device 2, the CPU 7 creates a disk group management table 81 based on collected disk information, and when a certain disk drive 10 is coupled to the disk array device 2 or deleted from the disk array device 2, a disk group management table 81 is updated based on newly obtained disk information or disk information that has not been obtained. A disk group management table 81 may be stored, for example, in the memory 8.

Disk information may include, for example, a disk ID, the type of a disk drive 10, and data transfer capacity of a disk drive 10. A disk ID is identification information to uniquely identify a disk drive 10. The type of a disk drive 10 may be, for example, a product model number of a disk drive 10. Data transfer capacity of a disk drive 10 may be, for example, a maximum data transfer length.

FIG. 2A illustrates an example of a disk group management table 81.

A disk group management table 81 stores disk management information with respect to each disk group. Disk management information may include a maximum data transfer length and the number of the disk drives 10 belonging to each of the disk groups. For example, a certain disk group may be a group that is made up of the same type of disk drives 10. A same type of disk drives 10 may be disk drives having same maximum data transfer length. A maximum data transfer length is a maximum data length that the disk drive 10 may transfer in a single data transfer operation. The number of disk drives 10 belonging to a disk group is counted with respect to a path. For example, a path #1 may include the transmission paths 111A and 111B, and a path #2 may include the transmission paths 112A and 112B.

Collected disk information may include the types of a disk drive 10 and data transfer capacity of a disk drive 10. Thus, the CPU 7 may create a disk group management table 81 based on the collected disk information. The collected disk information is stored in the memory 8 as a disk information table aside from the disk group management table 81.

Even when the types of disk drives 10, that is, product model numbers are different, it is probable that data transfer capacities of the disk drives 10 is same. In this case, even when product model numbers are different, the CPU 7 determines that disk drives 10 of which data transfer capacity is the same are disk drives belonging to a same disk group and creates the disk group management table 81. In addition, even when data transfer capacity of disk drives 10 are the same, the CPU 7 may determine that the disk drives 10 are disk drives belonging to different disk groups as long as product model numbers of the disk drives 10 are different and create a disk group management table 81.

The CPU 7 creates a transmission path management table 82 based on a disk group management table 81. Thus, the CPU 7 may be a transmission path management table creation unit. When a disk group management table 81 is created or updated, a transmission path management table 82 is also created or updated corresponding to the created or updated disk group management table 81. Thus, when the power is applied to the disk array device 2, the CPU 7 creates a transmission path management table 82, and when a disk drive 10 is coupled to the disk array device 2 or deleted from the disk array device 2, the CPU 7 updates a transmission path management table 82 as appropriate. That is, when the power is applied to the disk array device 2, the CPU 7 performs allocation of transmission paths to disk drives 10, and when a disk drive 10 is coupled to the disk array device 2 or deleted from the disk array device 2, the CPU 7 changes allocation of transmission paths to disk drives 10 as appropriate. The transmission path management table 82 may be, for example, stored in the memory 8.

FIG. 2B illustrates an example of the transmission path management table 82.

A transmission path management table 82 stores port management information with respect to a disk group. Port management information includes ports that disk drives 10 belonging to the disk group use for data transfer, that is, the DI 9A and 9B. For example, a port "a" may be the DI 9A and a port "B" may be the DI 9B.

The DI 9A or 9B that a disk drive 10 uses for data transfer is decided in a transmission path management table 82. As a result, one of the redundant transmission paths 111A, 111B, 112A, and 112B is allocated to the disk drive 10. That is, the CPU 7 divides three or more types of disk drives 10 into two groups based on the data transfer capacity, and each of the two groups is allocated to each of the redundant transmission paths 111A, 111B, 112A, or 112B.

Thus, the number of types of disk drives 10 is counted with respect to a redundant transmission path. For example, the number of types of disk drives 10 is counted for the redundant transmission paths 111A and 111B, and the redundant transmission paths 112A and 112B, separately. A redundant transmission path is regarded as a single path that couples the controller 3 to disk drives 10. That is, a redundant transmission path, which is a single path, is regarded as a unit for counting the number of types of the disk drives 10. The number of types of the disk drives 10 coupled to the transmission paths 111A and 111B may be same as or different from the number of types of the disk drives 10 coupled to the transmission paths 112A and 112B.

In addition, redundant transmission paths may not be limited to duplexed transmission paths. For example, when the multiplicity of transmission paths (that is, the multiplicity of the DI) may be set to "T" and the number of types of the disk drives 10 may be set to "K", the "T" may be "3" or more and the "K" may be "4=(T+1)" or more. That is, the CPU 7 may divide the "K" or more types of the disk drives 10 into the "T" groups based on the data transfer capacity and allocate each of the "T" groups to "T-multiplexed" transmission paths.

Figure 3A:
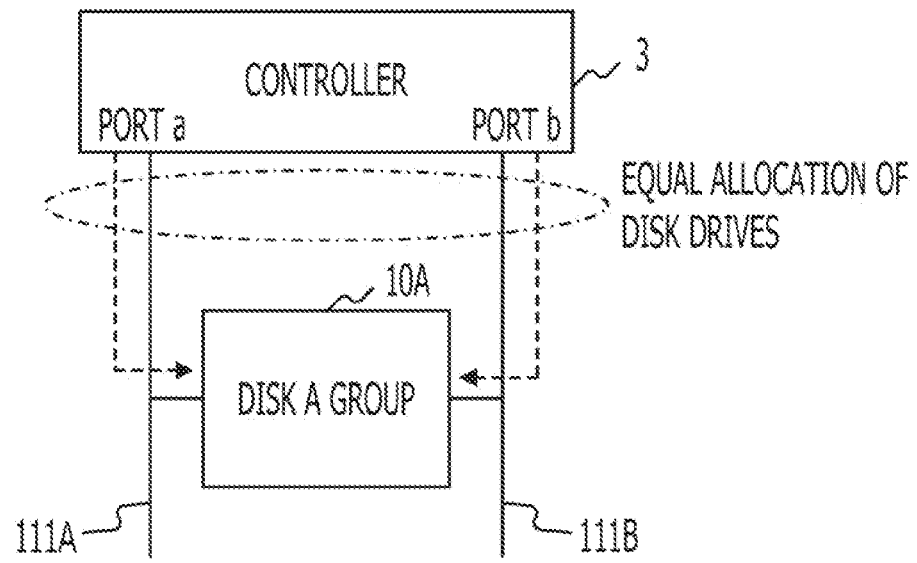
FIGS. 3A and 3B illustrate examples of disk allocation processing.
Figure 3B:
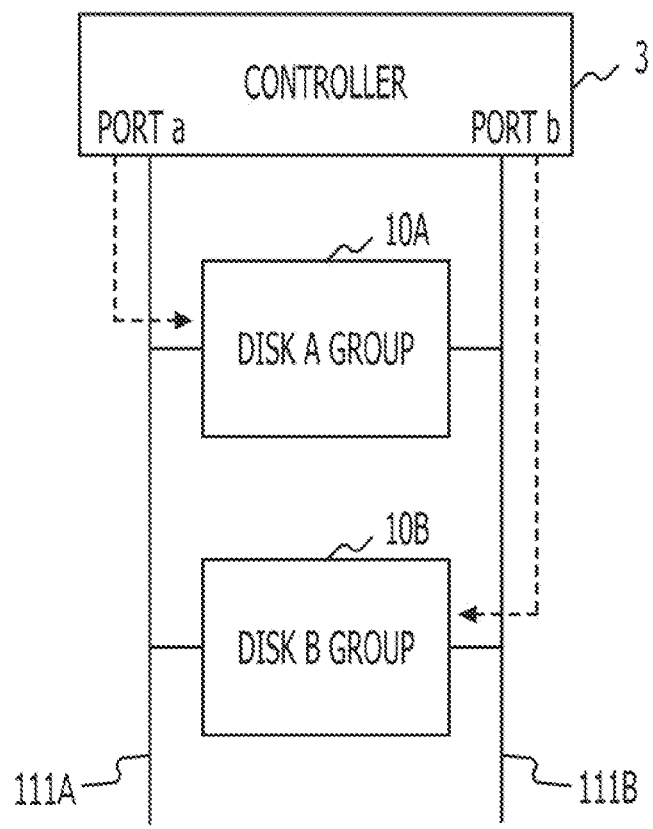
Figure 4:
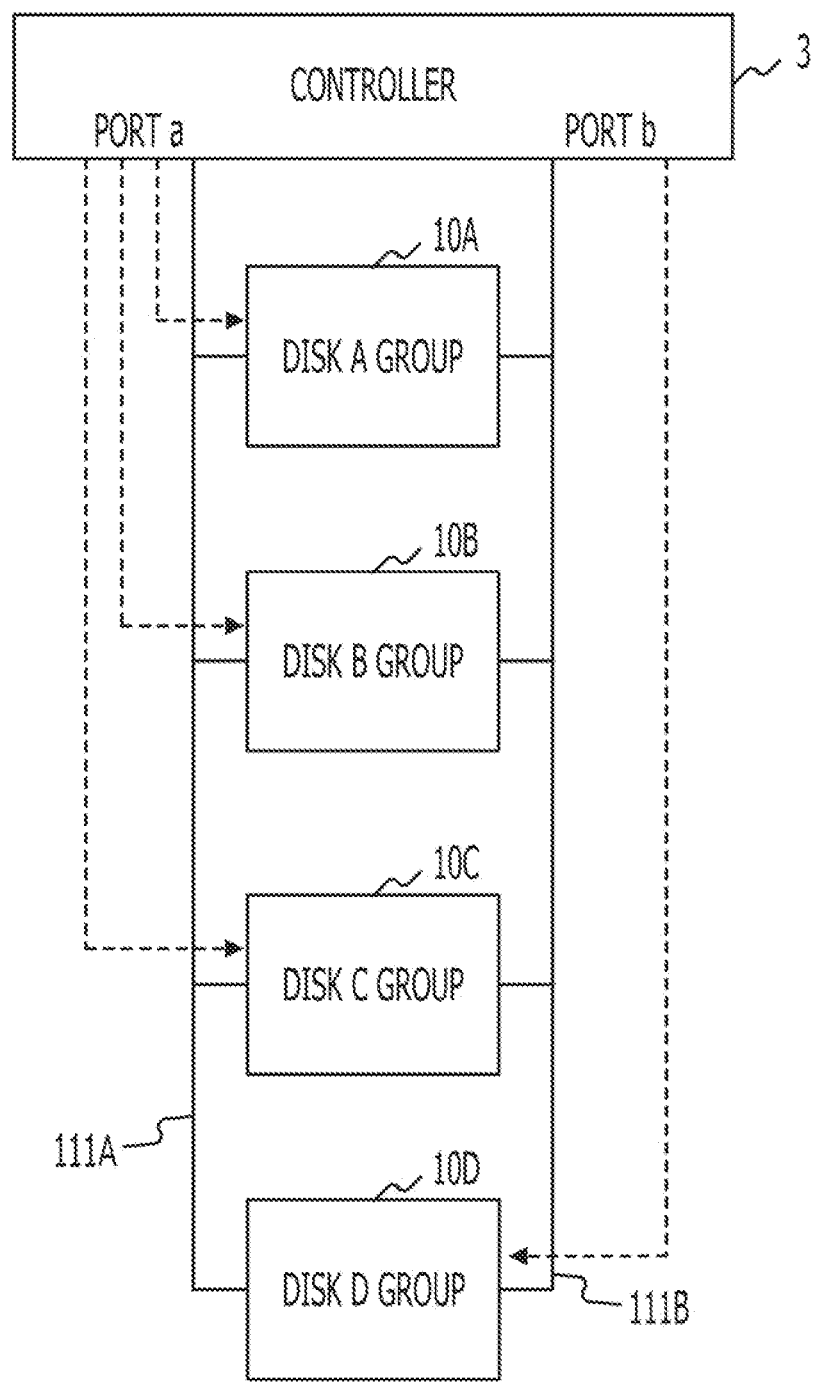
FIG. 4 illustrates an example of the disk allocation processing.

FIGS. 3A, 3B, and 4 illustrate examples of disk allocation processing.

As illustrated in FIGS. 3A, 3B, and 4, the CPU 7 performs allocation processing where the disk drives 10 are allocated to the transmission paths, that is, processing where a transmission path management table 82 is created. For example, the CPU 7 decides the DI 9A or 9B that a disk drive 10 uses for data transfer in a transmission path management table 82. That is, a disk drive 10 is allocated to one of the redundant transmission paths 111A, 111B, 112A, and 112B by the following processing.

The CPU 7 generally allocates three or more types of the disk drives 10 to one of the redundant transmission paths 111A, 111B, 112A and 112B. Thus, the CPU 7 may be a transmission path allocation processing unit. However, when a disk drive 10 is removed from the DE 41 or 42, it is probable that there is a one or two types of the disk drives 10 in addition to three or more types of the disk drives 10. As a result, the CPU 7 allocates disk drives 10 to the redundant transmission paths 111A, 111B, 112A and 112B as described below.

After the CPU 7 creates a disk group management table 81, the CPU 7 compares the multiplicity "T" of transmission paths with the number of types "K" of the disk drives 10 with respect to a redundant transmission path, that is, with respect to a path between the controller 3 and disk drives 10. The multiplicity "T" of transmission paths is a value stored in the CPU 7. The number of types "K" of the disk drives 10 is obtained from the disk group management table 81 of FIG. 2A with respect to a redundant transmission path.

For example, in the disk array device 2 of FIG. 1, the multiplicity "T" of transmission paths is "2". In the disk group management table 81, the number of types "K" of the disk drives 10 with respect to the path #1 is "4", and the number of types "K" of the disk drives 10 with respect to the path #2 is "4".

The CPU 7 performs processing depending on the result of comparison of the multiplicity "T" of transmission paths with the number of types "K" of the disk drives 10 and creates a transmission path management table 82. That is, the CPU 7 performs the allocation processing of the disk drives 10 by differently processing depending on the result of the comparison of the multiplicity "T" of transmission paths with the number of types "K" of the disk drives 10. In the disk array device 2 of FIG. 1, the multiplicity "T" of transmission paths is "2", and, generally, processing depending on the number of types "K" of the disk drives 10 may be performed.

For example, when the number of types "K" of disk drives 10 is "1", that is, when "K" is less than "T", allocation processing using the number of the disk drives 10 is performed. When the number of types "K" of disk drives 10 is "2", that is, when "K" is equal to "T", allocation processing using the number of the disk drives 10 or the types of the disk drives 10 is performed. When the number of types "K" of disk drives 10 is "3" or more, that is, when "K" is more than "T", allocation processing using the maximum data transfer length of the disk drives 10 is performed.

A case where there are a single type of the disk drives 10 coupled to the redundant transmission paths is described with reference to FIG. 3A.

When there is a single type of the disk drives 10, the CPU 7 allocates the single type of the disk drives 10 to the redundant transmission paths 111A, 111B, 112A, and 112B equally.

For example, in a disk group management table 81 (illustrated in FIG. 2A) that is created when the power is applied to the disk array device 2, and updated when a certain disk drive 10 is coupled to the disk array device 2 or deleted from the disk array device 2 as described above, disk management information of a mere disk A group 10A may be stored and disk management information of the other groups including a disk B group 10B, a disk C group 10C, a disk D group 10D may not be stored, that is, mere disk drives 10 belonging to the disk A group 10A are coupled to the redundant transmission paths 111A, 111B, 112A, and 112B.

In this case, in a transmission path management table 82, the CPU 7 allocates ten disk drives 10 to the port "a" and ten disk drives 10 to the port "b" with respect to the path #1, that is, as illustrated in FIG. 3A, the CPU 7 allocates ten disk drives 10 to the transmission path 111A that is a one side of the path #1 and allocates ten disk drives 10 to the transmission path 111B that is the other side of the path #1. As a result, in the path #1, imbalance of data transfer among the multiple disk drives 10 belonging to the disk A group 10A may be reduced.

After that, in the transmission path management table 82, the CPU 7 allocates ten disk drives 10 to the port "a" and ten disk drives 10 to the port "b" with respect to the path #2, that is, as illustrated in FIG. 3A, the CPU 7 allocates ten disk drives 10 to the transmission path 112A that is a one side of the path #2 and allocates ten disk drives 10 to the transmission path 112B that is the other side of the path #2. As a result, in the path #2, imbalance of data transfer among the multiple disk drives 10 belonging to the disk A group 10A may be reduced.

A case where there are two types of the disk drives 10 coupled to the redundant transmission paths is described with reference to FIG. 3B.

When there are two types of the disk drives 10, the CPU 7 allocates the disk drives 10 to the redundant transmission paths 111A, 111B, 112A, and 112B so that each of the redundant transmission paths 111A, 111B, 112A, and 112B has one of the two types of the disk drives 10.

For example, in a disk group management table 81 (illustrated in FIG. 2A) that is created when the power is applied to the disk array device 2, and updated when a certain disk drive 10 is coupled to the disk array device 2 or deleted from the disk array device 2 as described above, disk management information of the disk A group 10A and the disk B group 10B may be stored and disk management information of the disk C group 10C and the disk D group 10D may not be stored. That is, disk drives 10 belonging to the disk A group 10A and the disk B group 10B may be coupled to each of the transmission paths 111A, 111B, 112A, and 112B.

In this case, in a transmission path management table 82, the CPU 7 allocates disk drives 10 belonging to the disk A group 10A to the port "a" and allocates disk drives 10 belonging to the disk B group 10B to the port "b" with respect to the path #1, that is, as illustrated in FIG. 3B, the CPU 7 allocates disk drives 10 belonging to the disk A group 10A to the transmission path 111A that is a one side of the path #1 and allocates disk drives 10 belonging to the disk B group 10B to the transmission path 111B that is the other side of the path #1. As a result, in the path #1, imbalance of data transfer among the multiple disk drives 10 belonging to the disk A group 10A and the disk B group 10B may be reduced.

After that, in the transmission path management table 82, the CPU 7 allocates disk drives 10 belonging to the disk A group 10A to the port "a" and allocates disk drives 10 belonging to the disk B group 10B to the port "b" with respect to the path #2, that is, as illustrated in FIG. 3B, the CPU 7 allocates disk drives 10 belonging to the disk A group 10A to the transmission path 112A that is a one side of the path #2 and allocates disk drives 10 belonging to the disk B group 10B to the transmission path 112B that is the other side of the path #2. As a result, in the path #2, imbalance of data transfer among the multiple disk drives 10 belonging to the disk A group 10A and the disk B group 10B may be reduced.

When there are two types of the disk drives 10, the CPU 7 may allocate one of the two types of the disk drives 10 to the redundant transmission paths 111A, 111B, 112A, and 112B equally, and allocate the other type of the disk drives 10 to the redundant transmission paths 111A, 111B, 112A, and 112B equally. In this case, similar to the case where there is a single type of the disk drives 10, the allocation of the disk drives 10 to the transmission paths 111A, 111B, 112A, and 112B is performed with respect to each of the two types of the disk drives 10.

For example, the CPU 7 allocates ten disk drives 10 belonging to the disk A group 10A and ten disk drives 10 belonging to the disk B group 10B to transmission paths 111A and 111B that are included in the path #1, respectively. In addition, the CPU 7 allocates ten disk drives 10 belonging to the disk A group 10A and ten disk drives 10 belonging to the disk B group 10B to transmission paths 112A and 112B that are included in the path #2, respectively.

Which of the above-described two allocation processing is performed when there are two types of the disk drives 10 may be decided based on characteristics and learning of the disk array device 2.

A case where there are three or more types of the disk drives 10 coupled to the redundant transmission paths is described below with reference to FIG. 4.

When there are the three or more types of the disk drives 10, the CPU 7 allocates, by the type, the disk drives 10 to each of the redundant transmission paths 111A, 111B, 112A, and 112B by processing using data transfer capacity (described below). A maximum data transfer length that is a data length where each of the disk drives 10 may transfer in a single data transfer operation is used as data transfer capacity. A unit of a maximum data transfer length may be expressed, for example, by "kilobyte" as indicated by "KB" in FIGS. 2A, 9, and 11.

First, the CPU 7 performs processing for generating initial two groups. For example, when the number of types of the disk drives 10 may be "X", the CPU 7 divides the "X" into equal halves, so that the three or more types of the disk drives 10 are divided into initial two groups. As a result, even when there is the large number of types of the disk drives 10, initially two groups are obtained without performing complicated processing.

When the "X" is odd number, in a case where the types of the disk drives 10 are arranged in order of the lengths of data transfer, the CPU 7 extracts the type of disk drives 10 having a maximum data transfer length "Min" of which value is smallest, the type of disk drives 10 having a maximum data transfer length "Mid" of which value is in the middle, and the type of disk drives 10 having a maximum data transfer length "Max" of which value is largest. In addition, the CUP 7 obtains a difference "(Mid−Min)" between the maximum data transfer length "Mid" and the maximum data transfer length "Min", and obtains a difference "(Max−Mid)" between the maximum data transfer length "Max" and the maximum data transfer length "Mid". When the "(Mid−Min)" is less than"(Max−Mid)", the CPU 7 decides that the range from the type of the disk drives 10 having the maximum data transfer length "Min" to the type of disk drives 10 having the maximum data transfer length "Mid" makes up one group and the rest of types of the disk drives 10 makes up the other group. When the "(Mid−Min)" is larger than"(Max−Mid)", the CPU 7 decides that the range from the type of disk drives 10 having the maximum data transfer length "Mid" to the type of the disk drives 10 having the maximum data transfer length "Max" makes up one group and the rest of types of the disk drives 10 makes up the other group.

After that, the CPU 7 performs weighting processing for the initial two groups using a maximum data transfer length. For example, the CPU 7 may obtain the product of the maximum data transfer length and the number of disk drives 10 with respect to each of the types of the disk drives 10 and obtains the sum total of the products obtained from the types of the disk drives 10 belonging to the initial two groups.

After that, the CPU 7 performs verification processing for the initial two groups. For example, the CPU 7 obtains a ratio "Y" between the sum totals obtained from the initial two groups. For example, the larger sum total of one of the initial two groups is divided by the smaller sum total of the other initial group, thereby obtaining the ratio "Y" between the sum totals of the initial two groups. The CPU 7 compares the obtained ratio "Y" between the sum totals of the initial two groups with a threshold value. The threshold value may be empirically-decided and, for example, the value is "2". The threshold value may be values such as "1.5" and "3" other than "2".

When the ratio "Y" between the sum totals of the initial two groups is smaller than the threshold value, the CPU 7 divides, using the initial two groups as-is, three or more types of the disk drives 10 into two groups based on the data transfer capacity. That is, the initial two groups may be final two groups as-is.

When the ratio "Y" between the sum totals of the initial two groups is larger than the threshold value, the change processing for the initial two groups is performed. For example, the CPU 7 transfers a certain single type of disk drives 10 from an initial group of which sum total is larger to the other initial group of which sum total is smaller and changes the configuration of the initial groups. The transferred single type of the disk drives 10 is a type of desk devices 10 including a maximum data transfer length of which value is smallest in the initial group of which sum total is larger.

After that, the CPU 7 performed the above-described verification processing again. As a result, when the ratio "Y" between the sum totals of the initial two groups is smaller than the threshold value, the CPU 7 divides three or more types of the disk drives 10 into two groups based on the data transfer capacity using the changed initial two groups as-is. When the ratio "Y" between the sum totals of the initial two groups is larger than the threshold value, the CPU 7 performs the change processing of the initial two groups. That is, the CPU 7 repeats the verification processing and the change processing until the ratio "Y" between the sum totals of the initial two groups becomes smaller than the threshold value.

For example, in the disk group management table 81 (illustrated in FIG. 2A) created and updated when a certain disk drive 10 is coupled to the disk array device 2 or deleted from the disk array device 2 as described above, disk management information of the disk A group 10A to the disk D group 10D may be stored. That is, disk drives 10 belonging to the disk A group 10A to the disk D group 10D may be coupled to the transmission paths 111A, 111B, 112A, and 112B.

First, allocation of the disk drives 10 to path #1 is described below.

In the transmission path management table 82 illustrated in FIG. 2B, the CPU 7 allocates, with respect to the path #1, disk drives 10 belonging to the disk A group 10A and the disk B group 10B to the port "a", and allocates disk drives 10 belonging to the disk C group 10C and the disk D group 10D to the port "b". That is, the CPU 7 allocates disk drives 10 belonging to the disk A group 10A and the disk B group 10B to the transmission path 111A that is-one side of the path #1, and allocates disk drives 10 belonging to the disk C group 10C and the disk D group 10D to the transmission path 111B that is the other side of the path #1. As a result, in the path #1, imbalance of data transfer between the multiple disk drives 10 belonging to the disk A group 10A to the disk D group 10D may be reduced.

For such allocation processing, for example, the CPU 7 divides the four types of the disk drives 10 into initial two groups based on the data transfer capacity. As a result, the disk drives 10 are divided into one initial group including the disk A group 10A and the disk B group 10B and the other initial group including the disk C group 10C and the disk D group 10D.

With reference to FIG. 2A, the sum total of the initial group including the disk A group 10A and the disk B group 10B may be expressed by "(40×20)+(80×40)=4,000", and the sum total of the initial group including the disk C group 10C and the disk D group 10D may be expressed by "(100×20)+(120×40)=6,800". Thus, the ratio "Y" between the sum totals of the initial two groups may be expressed by "6,800/4,000=1.7". The value is smaller than the threshold value "2". As a result, the CPU 7 divides the four types of the disk drives 10 into a group including the disk A group 10A and the disk B group 10B and the other group including the disk C group 10C and the disk D group 10D using the two initial groups as-is.

In addition, the CPU 7 allocates each of the two groups to the redundant transmission paths 111A and 111B, respectively. As a result, the disk drives 10 belonging to the disk A group 10A and the disk B group 10B perform data transfer through the transmission path 111A, and the disk drives 10 belonging to the disk C group 10C and the disk D group 10D perform data transfer through the transmission path 111B.

Secondly, allocation of the disk drives 10 to path #2 is described below.

In the transmission path management table 82 illustrated in FIG. 2B, the CPU 7 allocates, with respect to the path #2, disk drives 10 belonging to the disk A group 10A to the disk C group 10C to the port "a", and allocates disk drives 10 belonging to the disk D group 10D to the port "b". That is, in contrast to the path #1, as illustrated in FIG. 4, the CPU 7 allocates the disk drives 10 belonging to the disk A group 10A to the disk C group 10C, to the transmission path 112A that is one side of the path #2, and allocates the disk drives 10 belonging to the disk D group 10D, to the transmission path 112B that is the other side of the path #2. As a result, in the path #2, imbalance of data transfer between the multiple disk drives 10 belonging to the disk A group 10A to the disk D group 10D may be reduced.

For such allocation processing, for example, the CPU 7 divides the four types of the disk drives 10 into initial two groups based on the data transfer capacity. As a result, the disk drives 10 are divided into one initial group including the disk A group 10A and the disk B group 10B and the other initial group including the disk C group 10C and the disk D group 10D.

With reference to FIG. 2A, the sum total of the initial group including the disk A group 10A and the disk B group 10B may be expressed by "(40×20)+(80×20)=2,400", and the sum total of the initial group including the disk C group 10C and the disk D group 10D may be expressed by "(100×20)+(120×60)=9,200". Thus, the ratio "Y" between the sum totals of the initial two groups may be expressed by "9,200/2,400=3.8". The value is larger than the threshold value "2". As a result, the CPU 7 transfers a single type of disk drives 10 from the initial group including the disk C group 10C and the disk D group 10D, of which sum total is larger, to the other initial group including the disk A group 10A and the disk B group 10B, of which sum total is smaller. The transferred single type of the disk drives 10 is the disk C group 10C that is a type of desk devices 10 including a maximum data transfer length of which value is smallest in the initial group including the disk C group 10C and the disk D group 10D.

In this case, with reference to FIG. 2A, the sum total of the initial group including the disk A group 10A to the disk C group 10C may be expressed by "(40×20)+(80×20)+(100×20)=4,400", and the sum total of the initial group including the disk D group 10D may be expressed by "(120×60)=7,200". Thus, the ratio "Y" between the sum totals of the initial two groups may be expressed by "7,200/4,400=1.6". The value is smaller than the threshold value "2". As a result, the CPU 7 divides the four types of the disk drives 10 into a group including the disk A group 10A to the disk C group 10C and a group including the disk D group 10D.

In addition, the CPU 7 allocates each of the two groups to the redundant transmission paths 112A and 112B, respectively. As a result, the disk drives 10 belonging to the disk A group 10A to the disk C group 10C perform data transfer through the transmission path 112A, and the disk drives 10 belonging to the disk D group 10D perform data transfer through the transmission path 112B.

Alternatively, the CPU 7 may change the configuration of initial groups so that the difference between the sum totals obtained from the initial two groups becomes smaller without limitation to the above-described verification processing and change processing.

For example, as described above, in the transmission path management table 82 illustrated in FIG. 2B, the sum total of the initial group including the disk A group 10A and the disk B group 10B may be 4,000, and the sum total of the initial group including the disk C group 10C and the disk D group 10D may be 6,800, with respect to the path #1. Thus, the difference between the sum totals of the initial two groups may be expressed by "6,800−4,000=2,800".

Thus, the CPU 7 transfers a single type of disk drives 10 from the initial group including the disk C group 10C and the disk D group 10D, of which sum total is larger, to the other initial group including the disk A group 10A and the disk B group 10B, of which sum total is smaller. The transferred single type of the disk drives 10 is the disk C group 10C that is a type of desk devices 10 including a maximum data transfer length of which value is smallest in the initial group including the disk C group 10C and the disk D group 10D.

In this case, with reference to FIG. 2A, the sum total of the initial group including the disk A group 10A to the disk C group 10C may be expressed by "(40×20)+(80×40)+(100×20)=6,000", and the sum total of the initial group including the disk D group 10D may be expressed by "120×40=4,800". Thus, the difference between the sum totals of the initial two groups may be expressed by "6,000−4,800=1,200".

The difference between the sum totals of the initial two groups after the disk C group 10C is transferred is smaller than the difference between the sum totals of the initial two groups before the disk C group 10C is transferred. Thus, the CPU 7 may divide the four types of the disk drives 10 into a group including the disk A group 10A to the disk C group 10C and the other group including the disk D group 10 using the initial groups after the disk C group 10C is transferred.

Whether a threshold value or a difference between the sum totals of initial two groups is utilized may be decided depending on each disk array device 2 so as to divide three or more types of the disk drives 10 into two groups.

In addition, in the disk group management table 81 of FIG. 2A, an average value "80" between the maximum data transfer length "40" of which value is smallest in the disk drives 10 and the maximum data transfer length "120" of which value is largest in the disk drives 10 is obtained, so that the disk A group 10A to the disk D group 10D may be divided into initial two groups using the average value as a threshold value. In this case, the disk B group 10B having a maximum data transfer length equal to the threshold value "80" may be included in any one of the initial two groups. In addition, disk drives 10 belonging to the disk B group 10B may be divided so that the difference of the number of disk drives 10 belonging to each of the initial two groups becomes smaller. In addition, the disk drives 10 belonging to the disk B group 10B may be equally divided into the initial two groups.

Figure 5:
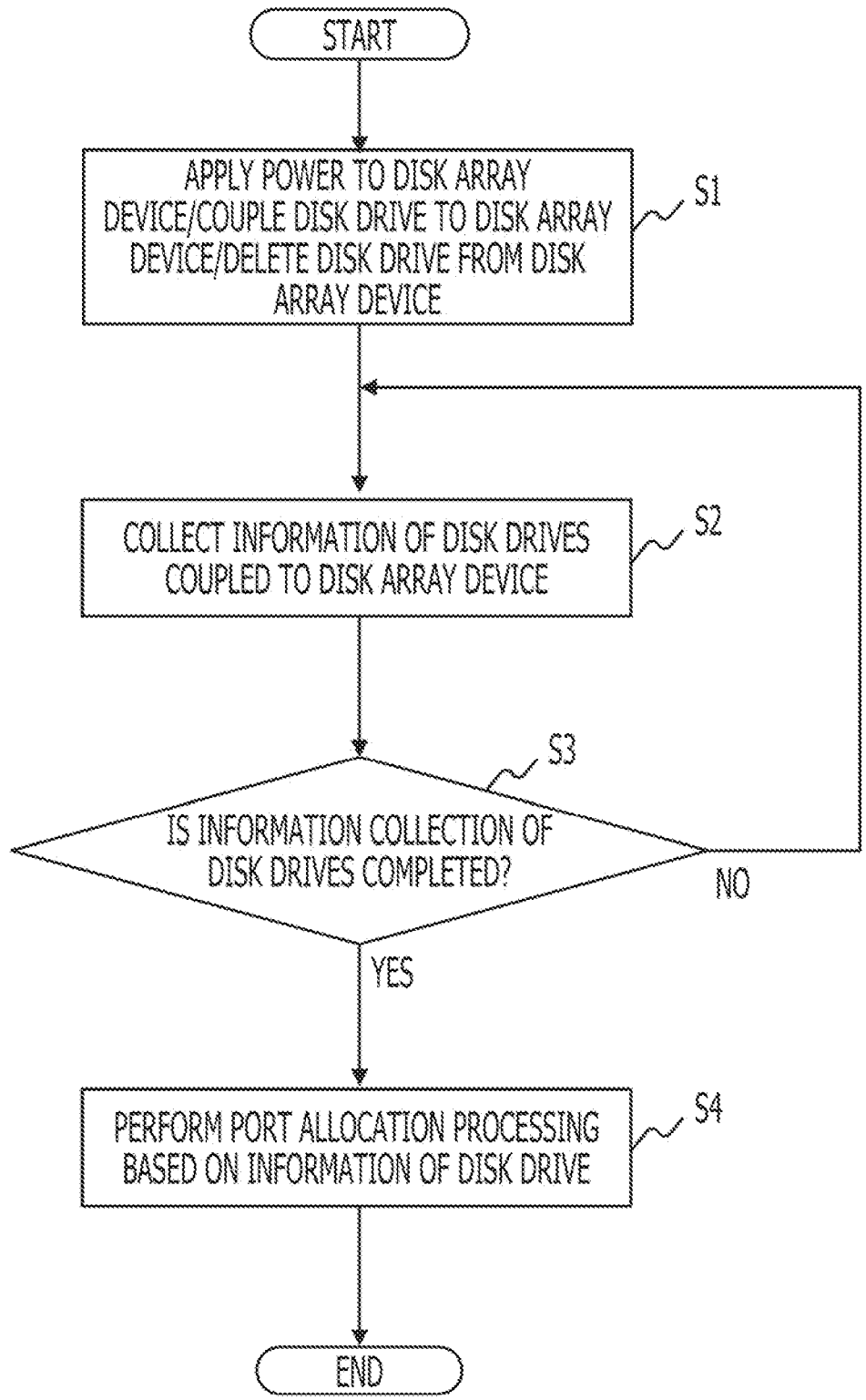
FIG. 5 illustrates an example of a disk management processing flow.

FIG. 5 illustrates a disk management processing flow.

When the power is applied to the disk array device 2, or when a new disk drive 10 is coupled to the disk array device 2 or a certain device 10 is deleted from the disk array device 2 (Operation S1), the CPU 7 of the controller 3 communicates with each of the multiple disk drives 10 coupled to the disk array device 2 to collect disk information of the disk drives 10 (Operation S2). The CPU 7 of the controller 3 determines whether or not the collection of the disk information from the disk drives 10 coupled to the disk array device 2 is completed (Operation S3). When the collection of the disk information is not completed ("No" in Operation S3), the CPU 7 of the controller 3 repeats Operation S2. The CPU 7 of the controller 3 determines that a certain disk drive 10 is deleted from the disk array device 2 when disk information of the certain disk drive 10 is not obtained even after Operation S2 is repeated for a certain number of times, and then the CPU 7 of the controller 3 determines that the collection of the disk information is completed. When the collection of the disk information is completed ("Yes" in Operation S3), the CPU 7 of the controller 3 creates a disk group management table 81 based on the disk information of the disk drives 10 and performs port allocation processing based on the disk group management table 81 as described above (Operation S4). As a result, a transmission path management table 82 is created.

As described above, in the beginning of Operation S4, the CPU 7 compares the multiplicity "T" of transmission paths with the number of types "K" of the disk drives 10. For example, when the number of types "K" of the disk drives 10 is "1", allocation processing using the number of the disk drives 10 may be performed in Operation S4. For example, when the number of types "K" of the disk drives 10 is "2", allocation processing using the types of the disk drives 10 may be performed in Operation S4. In addition, for example, when the number of types "K" of the disk drives 10 is "3" or more, allocation processing using a maximum data transfer length of the disk drives 10 may be performed in Operation S4 as illustrated in FIG. 6

Figure 6:
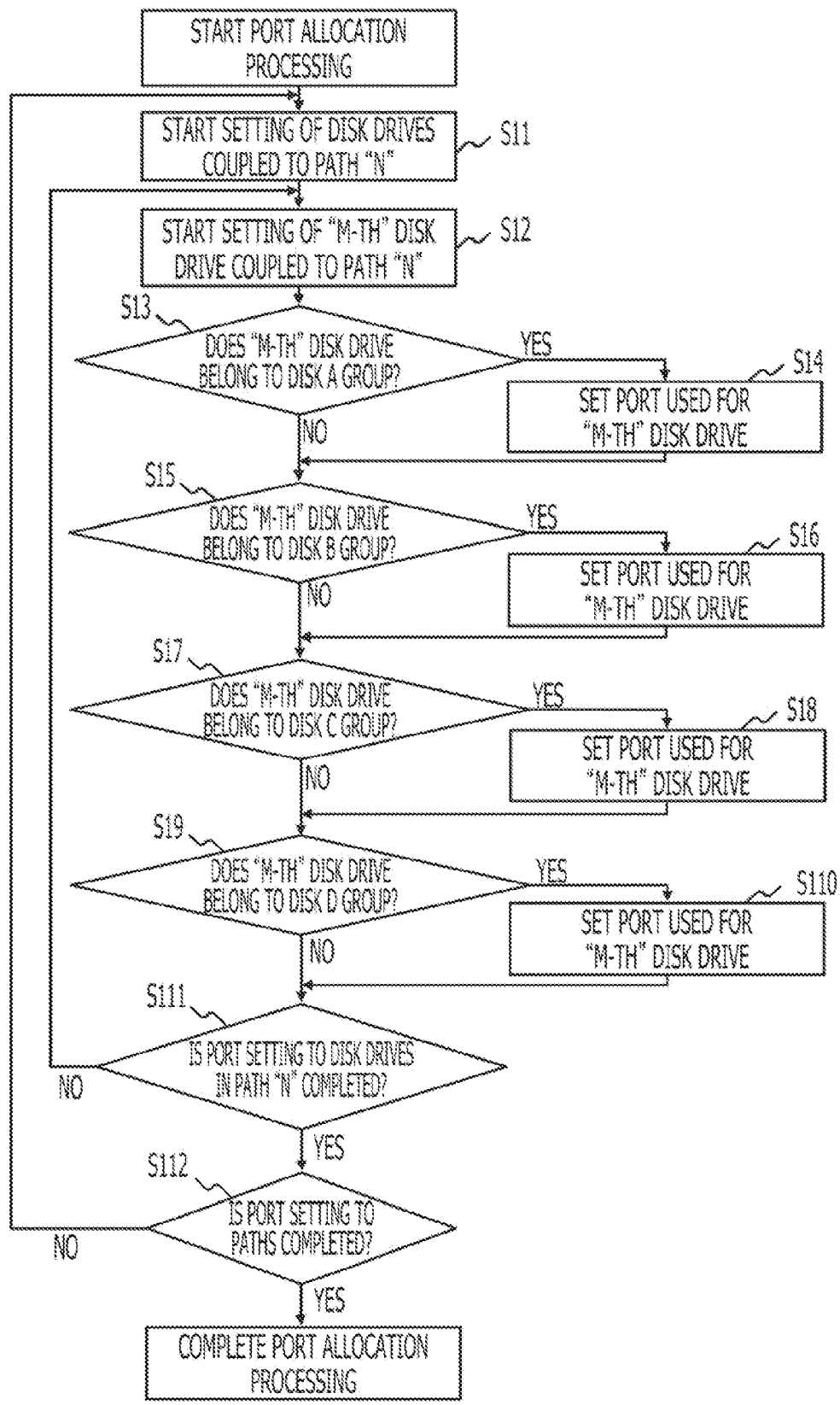
FIG. 6 illustrates an example of a disk allocation processing flow.

FIG. 6 illustrates a disk allocation processing flow.

The CPU 7 of the controller 3 selects a certain single path "N" (Operation S11), the selected path "N" is a path coupled to disk drives 10 of which number of types "K" is "3" or more. The CPU 7 refers to paths stored in the disk group management table 81 of FIG. 2A in order of arrangement, obtains the number of types "K" of the disk drives 10 coupled to a path "N", and selects the path "N" when the number of types "K" is "3" or more. In Operation S11, a port setting operation for the disk drives 10 installed in (coupled to) the path "N" starts.

After that, the CPU 7 of the controller 3 selects a certain disk drive 10, for example, an "M-th" disk drive 10 coupled to the path "N" (Operation S12). Thus, the disk group management table 81 of FIG. 2A generally stores disk ID of the disk drives 10 coupled to the path "N" in addition to the number of disk drives coupled to the path with respect to a path and a disk group. In the disk array device 2, the disk ID is identification information to uniquely identify disk drives 10. For example, in the disk group management table 81, disk ID such as "ID=#10", "ID=#11", and "ID=#12" are stored in addition to the number of the disks "20" with respect to the disk A group coupled to the path #1. These disk IDs indicate disk drives 10 belonging to the disk A group coupled to the path #1. In Operation S12, the port setting operation for the selected "M-th" disk drive 10 starts. For example, the "M-th" disk drive 10 may be selected among the disk drives 10 coupled to the path "N" in order of small number of the disk ID.

The CPU 7 of the controller 3 determines whether or not the "M-th" disk drive 10 belongs to the disk A group 10A coupled to the selected path "N" using the disk ID of the "M-th" disk drive 10 with reference to the selected path "N" in the disk group management table 81 (Operation S13).

When the "M-th" disk drive 10 belongs to the disk A group 10A ("Yes" in Operation S13), the CPU 7 of the controller 3 sets a port used for the "M-th" disk drive 10 with reference to the transmission path management table 82 (Operation S14).

When the "M-th" disk drive 10 does not belong to the disk A group 10A ("No" in Operation S13), as described above, the CPU 7 of the controller 3 determines whether or not the "M-th" disk drive 10 belongs to the disk B group 10B with reference to the disk group management table 81 (Operation S15). When the "M-th" disk drive 10 belongs to the disk B group 10B ("Yes" in Operation S15), the CPU 7 of the controller 3 sets a port used for the "M-th" disk drive 10 with reference to the transmission path management table 82 (Operation S16).

When the "M-th" disk drive 10 does not belong to the disk B group 10B ("No" in Operation S15), as described above, the CPU 7 of the controller 3 determines whether or not the "M-th" disk drive 10 belongs to the disk C group 10C with reference to the disk group management table 81 (Operation S17). When the "M-th" disk drive 10 belongs to the disk C group 10C ("Yes" in Operation S17), the CPU 7 of the controller 3 sets a port used for the "M-th" disk drive 10 with reference to the transmission path management table 82 (Operation S18).

When the "M-th" disk drive 10 does not belong to the disk C group 10C ("No" in Operation S17), as described above, the CPU 7 of the controller 3 determines whether or not the "M-th" disk drive 10 belongs to the disk D group 10D with reference to the disk group management table 81 (Operation S19). When the "M-th" disk drive 10 belongs to the disk D group 10D ("Yes" in Operation S19), the CPU 7 of the controller 3 sets a port used for the "M-th" disk drive 10 with reference to the transmission path management table 82 (Operation S110).

When the "M-th" disk drive 10 does not belong to the disk D group 10D ("No" in Operation S19), the CPU 7 of the controller 3 determines whether or not the port setting operation to the disk drives coupled to the path "N" is completed (Operation S111). For example, in the disk group management table 81 of FIG. 2A, the CPU 7 may set a flag indicating the completion of the port setting operation, to disk drives 10 completed the port setting operation. When the port setting operation to the disk drives 10 is not completed ("No" in Operation S111), the CPU 7 of the controller 3 repeats Operation S12.

When the port setting operation to the disk drives 10 is completed ("Yes" in Operation S111), the CPU 7 of the controller 3 determines whether or not the port setting operation to the paths is completed (Operation S112). For example, in the disk group management table 81 of FIG. 2A, the CPU 7 may set a flag indicating the completion of the port setting operation, to paths that are coupled to the disk drives 10 and then completed the port setting operation. When the port setting operation to the paths is not completed ("No" in Operation S112), the CPU 7 of the controller 3 repeats Operation S11. When the port setting operation to the paths is completed ("Yes" in Operation S112), the CPU 7 of the controller 3 ends the port allocation processing.

The ports set as described above are transmitted, for example, to the cache 6 and stored in the cache 6. As a result, the cache 6 performs data transfer through the ports set depending on the disk drives 10, that is, the transmission paths.

Figure 7:
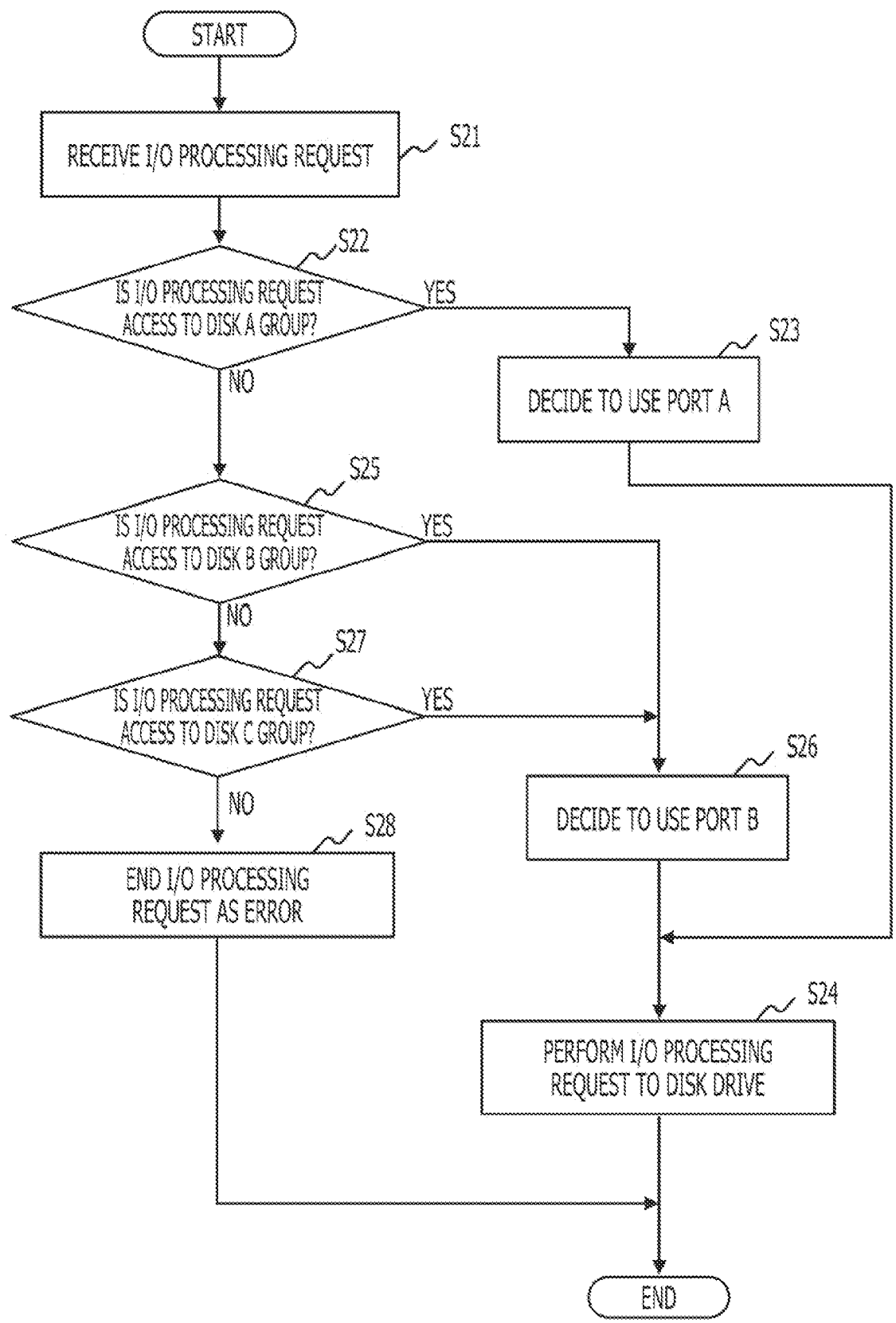
FIG. 7 illustrates another example of the disk allocation processing flow.

FIG. 7 illustrates another example of the disk allocation processing flow.

In the processing of FIG. 7, the port setting is performed each time an I/O processing request is received. In the processing of FIG. 7, for example, the disk group management table 81 of FIG. 2A and the transmission path management table 82 of FIG. 2B generally store disk management data of the disk A group 10A to the disk C group 10C in the path #1.

When the controller 3 receives an I/O processing request from the host computer 1 (Operation S21), the controller 3 determines whether or not the I/O processing request is access to the disk A group 10A (Operation S22). For example, the cache 6 transmits a received I/O processing request to the CPU 7 to inquire whether or not the I/O processing request is access to the disk A group 10A. In response to the inquiry, the CPU 7 determines whether or not the I/O processing request is access to the disk A group 10A, with reference to held disk management information using a disk ID of a certain disk drive 10 that is an access destination. The disk ID is included in the I/O processing request.

When the I/O processing request is access to the disk A group 10A ("Yes" in Operation S22), with reference to the transmission path management table 82, the controller 3 decides that a port allocated to the disk A group 10A, for example, the port "a" is used for access to the certain disk drive 10 (Operation S23) and performs access to the certain disk drive 10 using the decided port "a" (Operation S24). For example, when the I/O processing request is access to the disk A group 10A based on the determination operation, the CPU 7 transmits back the use of the port "a" to the cache 6, and when the I/O processing request is not access to the disk A group 10A, the CPU 7 transmits back to the cache 6 that the I/O processing request is not access to the disk A group 10A. As a result, the cache 6 accesses the certain disk drive 10 through the port "a" specified with respect to the certain disk drive 10.

When the I/O processing request is not access to the disk A group 10A ("No" in Operation S22), similar to Operation S22, the controller 3 determines whether or not the I/O processing request is access to the disk B group 10B (Operation S25). When the I/O processing request is access to the disk B group 10B ("Yes" in Operation S25), similar to Operation S23, the controller 3 decides that a port allocated to the disk B group 10B, for example, the port "b" is used for access to the certain disk drive 10 (Operation S26), and performs Operation S24 using the decided port "b".

When the I/O processing request is not access to the disk B group 10B ("No" in Operation S25), similar to Operation S22, the controller 3 determines whether or not the I/O processing request is access to the disk C group 10C (Operation S27). When the I/O processing request is access to the disk C group 10C ("Yes" in Operation S27), the controller 3 performs Operation S26, decides that a port allocated to the disk C group 10C, for example, the port "b" is used for access to the certain disk drive 10, and performs Operation S24 using the decided port "b".

When the I/O processing request is not access to the disk C group 10C ("No" in Operation S27), the controller 3 ends the processing for the I/O processing request as an error (Operation S28).

Another example of the disk allocation processing is described below with reference to FIGS. 8 to 11.

In the disk allocation processing of FIGS. 1 to 7, a maximum data transfer length is used for the decision of the port allocation, and the allocation of ports to the disk drives 10 may not be change. In addition, in the disk allocation processing of FIGS. 8 to 11, an I/O transfer length is used for the decision of the port allocation, and the allocation of ports to the disk drives 10 may be changed.

FIG. 8 illustrates another example of the disk allocation processing. In the disk allocation processing of FIG. 8, the disk group management table 81 of FIG. 2A and the transmission path management table 82 of FIG. 2B generally stores disk management data of the disk A group 10A to the disk C group 10C in the path #1.

In this case, for example, when the power is applied to the disk array device 2, as illustrated in FIG. 8, the disk A group 10A is allocated to the transmission path 111A, and the disk B group 10B to the disk C group 10C is allocated to the transmission path 111B by the processing of FIGS. 5 and 6.

After that, the CUP 7 of the controller 3 monitors access to the disk drives 10. The cache 6 transmits an I/O processing request command received from the host computer 1, to the CPU 7. The CPU 7 changes the allocation of the disk drives 10 to the redundant transmission paths 111A, 111B, 112A, and 112B based on an I/O transfer length that is a data transfer length specified by the I/O processing request command.

FIG. 9A illustrates an example of an I/O processing request commands.

For example, an I/O processing request command may include a command type, a source address of data transfer, a destination address of data transfer, an I/O transfer length. The command type may be, for example, a data write request or a data read request. The I/O transfer length may be a data length where data is transferred by execution of the I/O processing request command.

As described above, in the disk group management table 81, the maximum data transfer lengths of the disk A group 10A to the disk C group 10C may be values illustrated in FIG. 9B. In addition, the disk A group 10A is allocated to the transmission path 111A, and the disk B group 10B and the disk C group 10C are allocated to the transmission path 111B.

After that, the CPU 7 allocates a disk group having 40 or less kilobytes of an I/O transfer length, that is, a maximum data transfer length of the disk A group 10A, to the port "a", that is, the transmission path 111A. In addition, the CPU 7 allocates a disk group having more than 40 kilobytes of an I/O transfer length, that is, a maximum data transfer length of the disk A group 10A, to the port "b", that is, the transmission path 111B.

In addition, for example, the I/O transfer lengths of the disk A group 10A to the disk C group 10C may be values illustrated in FIG. 9C. That is, the I/O transfer length of the disk A group 10A may be 30 kilobytes, the I/O transfer length of the disk B group 10B may be 60 kilobytes, the I/O transfer length of the disk C group 10C may be 20 kilobytes.

In this case, the CPU 7 changes the allocation of the disk A group 10A to the disk C group 10C to the transmission paths 111A and 111B, from the state illustrated in FIG. 8 to a state illustrated in FIG. 10. That is, the CPU 7 allocates the disk A group 10A and the disk C group 10C to the transmission path 111A and allocates the disk B group 10B to the transmission path 111B.

For example, the I/O transfer length of the disk A group 10A is 30 kilobytes, and the disk A group 10A is allocated to the transmission path 111A as-is. Generally, the allocation of the disk A group 10A may not be changed. The I/O transfer length of the disk B group 10B is 60 kilobytes, and the disk B group 10B is allocated to the transmission path 111B as-is.

In addition, the I/O transfer length of the disk C group 10C is 20 kilobytes, and the disk C group 10C, that is, a disk group having 40 or less kilobytes of an I/O transfer length is allocated to the port "a" (the transmission path 111A). Thus, the allocation of the disk C group 10C is changed from the port "b" illustrated in FIG. 8, that is, the transmission path 111B, to the port "a", that is, the transmission path 111A. As a result, disk drives 10 may be allocated to the transmission paths based on the size of transferred data.

For example, there may be a difference in a length between an I/O transfer length in a data write request and an I/O transfer length in a data read request, depending on a disk drive 10. In addition, for example, in the use of a disk drive 10, the disk drive 10 may be used for data backup operations and operations where the host computer 1 accesses the disk drive 10 (hereinafter referred to as "normal operations"). In the disk drive 10 used for the data backup operations, accesses may be generally data write requests. In the disk drive 10 used for the normal operations, for example, it is probable that data read requests may be given priority over data write requests.

For example, a disk group may include disk drives 10 having a same I/O transfer length in a same command. Thus, in the disk drive 10 used for the data backup operations, the disk group is allocated to a transmission path using the I/O transfer length in a data write request. In addition, in the disk drive 10 used for the normal operations, the disk group is allocated to a transmission path using the I/O transfer length in a data read request. As a result, the disk drive 10 may be desirably allocated to a transmission path depending on the use of the disk drive 10.

Figure 11:
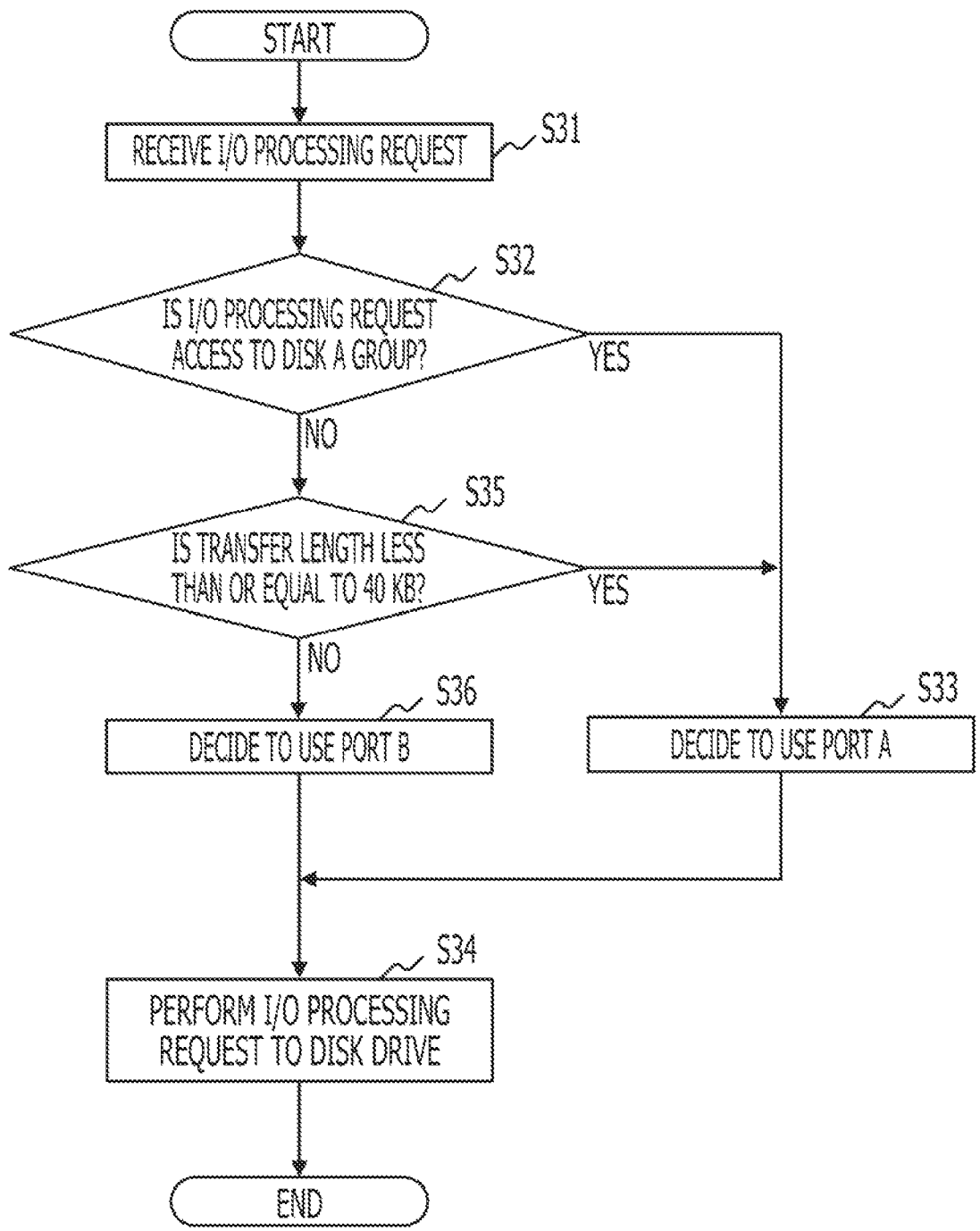
FIG. 11 illustrates another example of the disk allocation processing flow.

FIG. 11 illustrates another example of the disk allocation processing flow.

When the controller 3 receives an I/O processing request from the host computer 1 (Operation S31), the controller 3 determines whether or not the I/O processing request is access to the disk A group 10A (Operation S32). For example, the cache 6 transmits a received I/O processing request to the CPU 7 to inquire whether or not the I/O processing request is access to the disk A group 10A. In response to the inquiry, the CPU 7 determines whether or not the I/O processing request is access to the disk A group 10A, with reference to held disk management information using a disk ID of a certain disk drive 10 that is an access destination. The disk ID is included in the I/O processing request.

When the I/O processing request is access to the disk A group 10A ("Yes" in Operation S32), with reference to the transmission path management table 82, the controller 3 decides that a port allocated to the disk A group 10A, for example, the port "a" is used for access to the certain disk drive 10 (Operation S33) and performs access to the certain disk drive 10 using the decided port "a" (Operation S34). For example, when the I/O processing request is access to the disk A group 10A based on the determination operation, the CPU 7 transmits back the use of the port "a" to the cache 6, and when the I/O processing request is not access to the disk A group 10A, the CPU 7 transmits back to the cache 6 that the I/O processing request is not access to the disk A group 10A. As a result, the cache 6 accesses the certain disk drive 10 through the port "a" specified with respect to the certain disk drive 10.

When the I/O processing request is not access to the disk A group 10A ("No" in Operation S32), the controller 3 determines whether or not an I/O transfer length in the I/O processing request is 40 or less kilobytes (Operation S35). When an I/O transfer length in the I/O processing request is 40 or less kilobytes ("Yes" in Operation S35), the controller 3 performs Operation S33, decides that the port "a" is used for access to the certain disk drive 10, and performs Operation S34 using the decided port "a".

When an I/O transfer length in the I/O processing request is more than 40 kilobytes ("No" in Operation S35), the controller 3 decides that the port "b" is used for access to the certain disk drive 10 (Operation S36) and performs Operation S34 using the decided port "b".

In the processing of FIG. 11, generally, the CPU 7 of the controller 3 may set a disk group having a maximum data transfer length of which value is smallest, for example, disk drives 10 belonging to the disk A group 10A as one of initial two groups. In addition, generally, the CPU 7 of the controller 3 may set disk groups having the other maximum data transfer lengths, for example, the disk drives 10 belonging to the disk B group 10B to the disk D group 10D as the other initial group. As a result, the number of data transfer performed by the disk drives 10 belonging to the disk A group 10A having the maximum data transfer length of which value is smallest may be set more than the number of data transfer performed by the other disk drives 10.

In addition, the CPU 7 of the controller 3 may set disk drives 10 belonging to the disk D group 10D having a maximum data transfer length of which value is largest as one of initial two groups and set disk drives 10 belonging to the disk A group 10A to the disk C group 10C having the other maximum data transfer lengths as the other initial group. As a result, data transfer in the disk drives 10 belonging to the disk D group 10D having a maximum data transfer length of which value is largest may be prevented from interfering with data transfer in the other disk drives 10.

In the disk allocation processing of FIGS. 8 to 11, the allocation of the disk drives 10 is changed based on I/O transfer lengths, however, the allocation of the disk drives 10 may be changed based on other parameters.

For example, the CPU 7 may monitor accesses to disk drives 10 and change the allocation of the disk drives 10 to redundant transmission paths based on access frequency. In this case, the CPU 7 may set a disk drive 10 that is most frequently accessed as one of initial two groups and set the other disk drives 10 as the other initial group. As a result, data transfer in the disk drive 10 that is most frequently accessed may be prevented from interfering with data transfer in the other disk drives 10.

In addition, the CPU 7 may be previously defined to ignore the transmission path management table 82. For example, when failure occurs in one of redundant transmission paths, the CPU 7 may ignore the transmission path management table 82 and access a disk drive 10 through the other redundant transmission path. As a result, even when failure occurs in one of the redundant transmission paths in the disk array device 2, data transfer may be performed regardless of the above-described disk allocation processing.

Although the embodiments of the present invention are numbered with, for example, "first," "second," or "third," the ordinal numbers do not imply priorities of the embodiment. Many other variations and modifications will be apparent to those skilled in the art.

All examples and conditional language recited herein are intended for pedagogical purposes to aid the reader in understanding the aspects of the invention and the concepts contributed by the inventor to furthering the art, and are to be construed as being without limitation to such specifically recited examples and conditions, nor does the organization of such examples in the specification relate to a showing of the superiority and inferiority of the aspects of the invention.

Although the embodiment in accordance with aspects of the present invention has been described in detail, it should be understood that various changes, substitutions, and alterations could be made hereto without departing from the spirit and scope of the invention.

Moreover, the term "or" is intended to mean an inclusive "or" rather than an exclusive "or". That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

What is claimed is:

1. A disk array device comprising:
   a cache memory;
   a plurality of types of disk drives of which maximum data transfer lengths are different, a maximum data transfer length being a maximum size of data length to be transferred by a disk drive in a single data transfer operation;
   redundant transmission paths that are data transfer paths between the cache memory and the disk drives; and
   a controller to:
      calculate a sum of maximum data transfer lengths of all of the disk drives in each of three types of disk drives when the disk drives have three types,
      divide the disk drives into two groups based on the calculated sum of maximum data transfer lengths of all of the disk drives in each of three types, and
      allocate the two groups to respective redundant transmission paths when the disk drives have three types,
   wherein the controller that:
      divides three or more types of disk drives into initial two groups when the disk drives have three or more types,
      obtains a product of the maximum data transfer length in each type of the disk drives and a number of the disk drives in each type of the disk drives,
      obtains a sum total of the products obtained from each type of the disk drives in each of the initial two groups,
      performs a verification processing for the initial two groups, the verification processing including obtaining a ratio between the sum totals of the maximum data transfer lengths of the initial two groups,
      determines final two groups for the three or more types of disk drives based on the ratio and the initial two groups, and
      allocates the final two groups to redundant transmission paths when the disk drives have three or more types,
   wherein a processing to divide three or more types of disk drives into the initial two groups includes:
      arranging maximum data transfer lengths of three or more types of disk drives in order of a maximum data transfer length when the disk drives have three or more types,
      extracting a type of disk drives having a maximum data transfer length of which value is smallest, a type of disk drives having a maximum data transfer length of which value is in a middle, and a type of disk drives having a maximum data transfer length of which value is largest from among the arranged maximum data transfer lengths of the three or more types of disk drives,
      obtaining a first difference between the maximum data transfer length of which value is smallest and the maximum data transfer length of which value is in a middle,
      obtaining a second difference between the maximum data transfer length of which value is in a middle and the maximum data transfer length of which value is largest,
      determining that a range from the type of disk drives having the maximum data transfer length of which value is smallest to the type of disk drives having the maximum data transfer length of which value is in a middle makes up the one of the initial two groups, and that a rest of the three or more types of disk drives makes up the other of the initial two groups, when the second difference is larger than the first difference, and
      determining that a range from the type of disk drives having the maximum data transfer length of which value is in a middle to the type of disk drives having the maximum data transfer length of which value is largest makes up the one of the initial two groups, and that a rest of the three or more types of disk drives makes up the other of the initial two groups, when the first difference is larger than the second difference.

* * * * *